United States Patent
Nori et al.

(10) Patent No.: US 7,996,443 B2
(45) Date of Patent: Aug. 9, 2011

(54) SCHEMA GRAMMAR AND COMPILATION

(75) Inventors: Anil Kumar Nori, Redmond, WA (US); Bekim Demiroski, Redmond, WA (US); Gregory S. Friedman, Redmond, WA (US); Michael B. Taylor, Seattle, WA (US); Michael E. Deem, Redmond, WA (US); Michael J. Newman, Redmond, WA (US); Michael J. Pizzo, Bellevue, WA (US); Nigel R. Ellis, Redmond, WA (US); Sanjay Nagamangalam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 11/185,155

(22) Filed: Jul. 20, 2005

(65) Prior Publication Data

US 2006/0195459 A1 Aug. 31, 2006

Related U.S. Application Data

(60) Provisional application No. 60/657,521, filed on Feb. 28, 2005.

(51) Int. Cl.
*G06F 7/00* (2006.01)
(52) U.S. Cl. ...................................................... 707/807
(58) Field of Classification Search .................. 707/100, 707/807, 810; 715/513; 717/102
See application file for complete search history.

(56) References Cited

U.S. PATENT DOCUMENTS

| | | | |
|---|---|---|---|
| 5,315,709 A | 5/1994 | Alston et al. | |
| 5,548,761 A | 8/1996 | Balasundaram et al. | |
| 5,937,410 A | 8/1999 | Shen | |
| 6,272,521 B1 | 8/2001 | Jablonski et al. | |
| 6,553,141 B1 | 4/2003 | Huffman | |
| 6,591,276 B1 | 7/2003 | Dockter et al. | |
| 6,910,182 B2 | 6/2005 | Huang | |
| 7,096,229 B2 | 8/2006 | Dettinger et al. | |
| 7,634,515 B2 | 12/2009 | Hunter et al. | |
| 2001/0042058 A1 | 11/2001 | Harrington et al. | |
| 2002/0178008 A1* | 11/2002 | Reynar | 704/272 |
| 2002/0194220 A1 | 12/2002 | Sluiman | |
| 2003/0018964 A1 | 1/2003 | Fox et al. | |
| 2003/0051226 A1* | 3/2003 | Zimmer et al. | 717/102 |
| 2003/0121026 A1* | 6/2003 | Wang et al. | 717/124 |
| 2003/0167444 A1* | 9/2003 | Zorc | 715/513 |
| 2003/0220893 A1 | 11/2003 | Dettinger et al. | |
| 2004/0015511 A1* | 1/2004 | Seefeldt et al. | 707/102 |
| 2004/0044990 A1* | 3/2004 | Schloegel et al. | 717/113 |
| 2004/0073870 A1* | 4/2004 | Fuh et al. | 715/513 |
| 2004/0139126 A1 | 7/2004 | Thacker et al. | |
| 2004/0261008 A1 | 12/2004 | Pepin et al. | |

(Continued)

OTHER PUBLICATIONS

Simonet, "An Extension of HM(X) with Bounded Existential and Universal Data-Types" (2003) Proceedings of the 8th ACM GIGPLAN. Last accessed Apr. 3, 2009, 15 pages.

(Continued)

*Primary Examiner* — Pierre M Vital
*Assistant Examiner* — Truong V Vo

(57) ABSTRACT

The subject innovation provides a system and/or a method that facilitates developing schemas for a file storage system. A type definition component can provide a schema grammar, wherein a generator component can employ the schema grammar to build the schema for the file storage system. The schema grammar can describe information types stored in the file storage system that are represented as instances of complex types that are part of a type system that supports inheritance. The schema grammar can support a declaration of an association between types, versioning specifications, and/or content indexing specifications.

16 Claims, 12 Drawing Sheets

U.S. PATENT DOCUMENTS

| | | | |
|---|---|---|---|
| 2005/0014494 A1* | 1/2005 | Owen et al. | 455/419 |
| 2005/0050020 A1 | 3/2005 | Oki et al. | |
| 2005/0091255 A1 | 4/2005 | Rajan et al. | |
| 2005/0091585 A1 | 4/2005 | Parikh et al. | |
| 2005/0262378 A1 | 11/2005 | Sleeman et al. | |
| 2005/0289157 A1 | 12/2005 | Vaschillo et al. | |
| 2006/0064425 A1 | 3/2006 | Kakivaya et al. | |
| 2006/0184571 A1 | 8/2006 | Liu et al. | |
| 2006/0195459 A1 | 8/2006 | Nori et al. | |
| 2006/0195460 A1 | 8/2006 | Nori et al. | |
| 2006/0195477 A1 | 8/2006 | Deem et al. | |
| 2006/0200486 A1 | 9/2006 | Castro et al. | |
| 2006/0248092 A1 | 11/2006 | Keller et al. | |
| 2007/0011194 A1 | 1/2007 | Gurevich | |

OTHER PUBLICATIONS

Shoshani, "A Logical-Level Approach to Data Base Conversion". (1975) Proceedings of 1975 ACM SIGMOD International Conference on Management of Data. Last accessed Apr. 3, 2009, 11 pages.

Buneman, et al. "Inheritance and Persistence in Data Base Conversion" (1987) ACM Computing Surveys. Last accessed Apr. 3, 2009, 12 pages.

Ferrandina, et al. "Implementing Lazy Database Updates For An Object Data System". In Proceedings of the 20th International Conference on Very Large Data Base, 1994, pp. 261-272, Santiago, Chile. Last accessed Apr. 3, 2009, 12 pages.

Garlan, et al., "TransformGen: Automating The Maintenance of Structure-Oriented Environments", ACM Transactions on Programming Languages and Systems, May 1994, pp. 727-774, vol. 16, No. 3. Last accessed Apr. 3, 2009, 48 pages.

Lerner. "A Model for Compound Type Changes Encountered in Schema Evolution", ACM Transactions on Database Systems, pp. 83-127, vol. 25 No. 1, Mar. 2000. Last accessed Apr. 3, 2009, 45 pages.

Skarra, et al. "The Management Changing Types In An Obejct-Oriented Database". In Proceedings of the Conference on Object-Oriented Programming Systems, Language and Applications, OOPSLA '86, Apr. 1986, pp. 483-495, ACM Press, New York. Last accessed Apr. 3, 2009, 13 pages.

OA dated Aug. 15, 2008 for U.S. Appl. No. 11/562,438, 28 pages.
OA dated Mar. 9, 2009 for U.S. Appl. No. 11/562,438, 34 pages.
OA dated Jul. 3, 2008 for U.S. Appl. No. 11/128,893, 23 pages.
OA dated Mar. 6, 2009 for U.S. Appl. No. 11/128,893, 28 pages.
OA dated Nov. 28, 2008 for U.S. Appl. No. 11/094,923, 13 pages.
OA dated May 15, 2009 for U.S. Appl. No. 11/094,923, 13 pages.
OA dated Jul. 13, 2009 for U.S. Appl. No. 11/562,438, pages.
OA dated Oct. 2, 2007 for U.S. Appl. No. 11/128,893, 20 pages.
OA dated Oct. 27, 2009 for U.S. Appl. No. 11/094,923, 23 pages.

* cited by examiner

SCHEMA GRAMMAR AND COMPILATION

CROSS-REFERENCE TO RELATED APPLICATION(S)

This application claims the benefit of U.S. Provisional Patent Application Ser. No. 60/657,521 filed on Feb. 28, 2005, entitled "SCHEMA GRAMMAR AND COMPILATION." The entirety of which application is incorporated herein by reference.

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, and a record includes a set of fields. Records are commonly indexed as rows within a table and the record fields are typically indexed as columns, such that a row/column pair of indices can reference a particular datum within a table. For example, a row may store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. The database application allows the user to compare, sort, order, merge, separate and interconnect the data, so that useful information can be generated from the data. Yet, the capacity and versatility of databases have grown to an incredible amount to allow a virtually endless storage capacity utilizing databases. Moreover, typical database systems offer limited query-ability based upon time, file extension, location, and size. For example, in order to search the vast amounts of data associated to a database, a typical search is limited to a file name, a file size, a date of creation, wherein such techniques are deficient and inept.

With a continuing and increasing creation of data from end-users, the problems and difficulties surrounding finding, relating, and storing such data is reaching its peak. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, designing a compact disc label, all require the creation of data.

Not only are the complications surrounding users, developers have similar issues with data. Developers create and write a myriad of applications varying from personal applications to highly developed enterprise applications. While creating and/or developing, developers frequently, if not always, gather data. While obtaining such data, the data needs to be stored. In other words, the problems and difficulties surrounding finding, relating, and storing data jeopardizes both the developer and the end user.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate developing schemas associated to a file storage system. A type definition component can provide the schema grammar (e.g., including a schema syntax) that can allow the creation and/or build of a schema. The schema grammar can be a computer program language vocabulary that has formally defined syntax in accordance to, for instance, a data model for which such schema can be installed and/or deployed. A type can be declared in the schema, wherein each schema can define a namespace to serve as a logical grouping for a set of types and/or other schema elements. A typical information type stored can be a document, an image, music, video, a contact, a message, etc. These units of information can be represented as instances of complex types that are part of a type system that supports inheritance. The type can be described utilizing the schema grammar to define a complex type in a type hierarchy.

In accordance with one aspect of the claimed subject matter, the type definition component can include a grammar component that provides the schema grammar from which a user and/or developer can invoke/access/utilize to build at least one schema for the file storage system. Moreover, the type definition component can include a generator component that generates the schema based at least in part upon the schema grammar. The generated schema can be deployed and/or installed in the file storage system to provide an abstract description of at least one type of information.

In accordance with another aspect of the claimed subject matter, the type definition component can include a schema component that provides at least one definitional concept. The schema component can utilize a naming concept and/or a property value concept in conjunction with the schema grammar. Furthermore, the type definition component can include a format component that invokes at least one format to the schema grammar and/or the schema. Additionally, the type definition component can include an element component that can define and utilize elements that facilitate utilizing the schema grammar to build a schema.

In accordance with another aspect of the innovation described herein, the type definition component can include a type component. The type component can declare at least one type related to the schema grammar. Moreover, the type definition component can provide an association component that supports a declaration of an association between types. In addition, the type definition component can include an index component that can support a content indexing specification.

In other aspects of the claimed subject matter, methods are provided that facilitate developing schemas associated to a file storage system.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
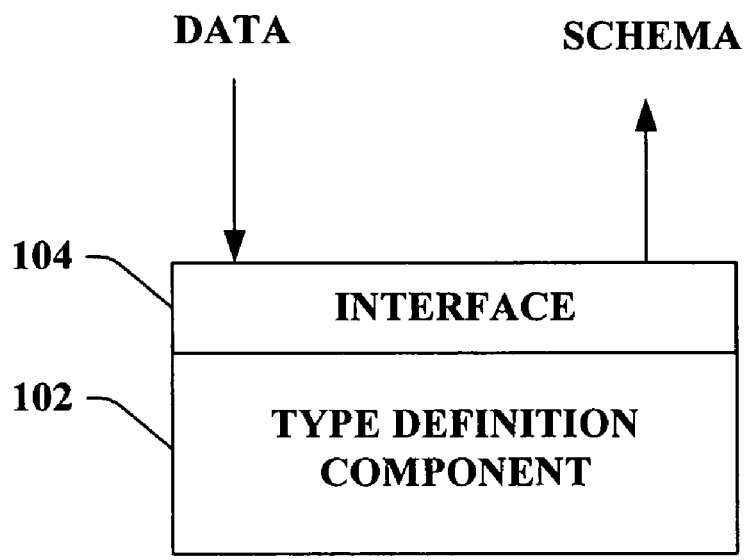
FIG. 1 illustrates a block diagram of an exemplary system that facilitates providing and/or implementing a schema by utilizing a schema grammar.

As utilized herein, terms "component," "system," "interface," "schema," "grammar," "syntax," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates invoking a schema grammar that allows generation of at least one schema. The schema grammar can be a computer program language vocabulary that has formally defined syntax in accordance to, for instance, a data model for which such schema can be installed and/or deployed. For instance, a type can be declared in the schema, wherein each schema can define a namespace to serve as a logical grouping for a set of types and/or other schema elements. Typical information type stored can be a document, an image, music, a video, a contact, a message, etc. These units of information can be represented as instances of complex types that are part of a type system that supports inheritance. The type can be described utilizing the schema grammar to define a complex type in a type hierarchy. In other words, the schema grammar can be utilized to generate a schema, wherein the schema grammar (e.g., utilizing the schema syntax) can provide a description of data stored and relationships associated therewith.

A type definition component 102 can provide the schema grammar (e.g., including a schema syntax) that can allow creation and/or build of the schema. The type definition component 102 provides a declarative mechanism to install a schema into a file storage system (not shown). It is to be appreciated that the file storage system can be based at least in part upon a data model. The type definition component 102 can employ the schema grammar such that a declarative type description language is provided to generate and/or build one or more schemas. The type definition component 102 can provide the schema grammar with a format and/or a constraint that relates to an end-format for the schema that is built. For instance, an extensible markup language (XML) can be provided as a basis for the schema grammar to provide the one or more schema in the end-format of XML. Moreover, the type definition component 102 can provide the schema grammar to support a declaration of association (e.g., a relationship) between at least two types, a versioning specification (e.g., to facilitate validation and/or verification) and/or a content indexing specification.

The system 100 further includes an interface component 104, which provides various adapters, connectors, channels, communication paths, etc. to integrate the type definition component 102 into virtually any operating system. In addition, the interface component 104 can provide various adapters, connectors, channels, communication paths, etc. that provide for interaction with data and the type definition component 102. It is to be appreciated that although the interface component 104 is incorporated into the type definition component 102, such implementation is not so limited. For instance, the interface component 104 can be a stand-alone component to receive or transmit the data in relation to the system 100. In one example, a developer and/or a user can interact with the type definition component 102 to utilize and/or invoke the schema grammar. Once built, the schema can be installed and/or deployed in a particular environment such as, but not limited to, a data model, a file storage system, a hierarchical storage system, etc.

It is to be appreciated that the interface 104 can handle any communication and/or interaction with the type definition component 102 in relation to the schema grammar. For instance, the interface 104 can receive communications from a developer that can utilize the type definition component 102 to create a schema for a specific file storage system. In another example, the interface 104 can receive data created in respect to the schema grammar, wherein the data can be reviewed and/or converted according to the schema grammar to allow the generation of schema.

Figure 2:
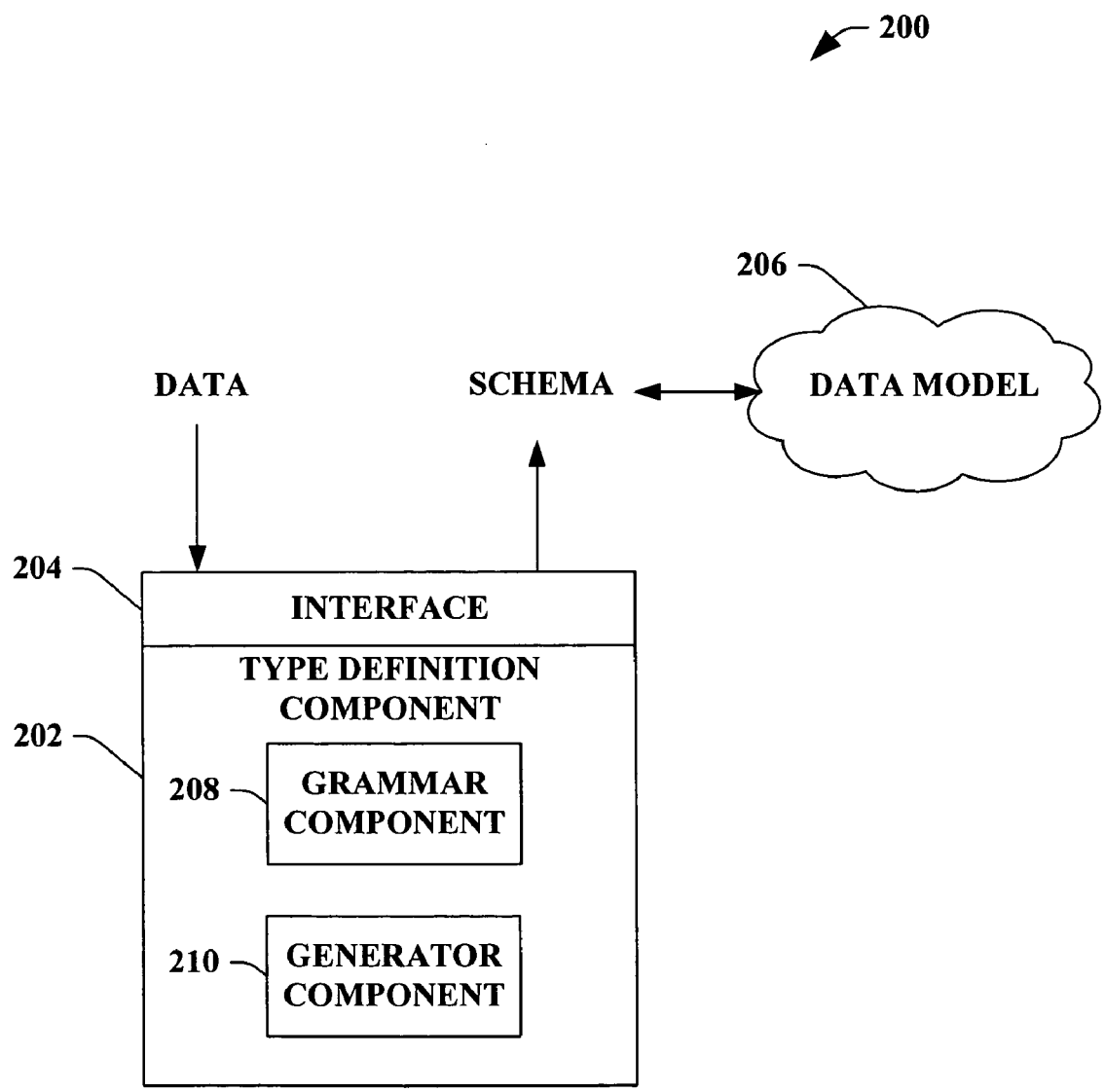
FIG. 2 illustrates a block diagram of an exemplary system that facilitates utilizing a schema grammar to generate a schema in association with a data model.

FIG. 2 illustrates a system 200 that facilitates utilizing a schema grammar that can provide the generation and/or creation of a schema. A file storage system (not shown) can enable storing, finding and/or relating information types stored such as, but not limited to, a document, an image, a video, a contact, a message, an email, etc. Such informational units can be represented as instances of complex types that can be part of a type system supporting inheritance and/or a hierarchical type structure. A type definition component 202 can provide an abstract description of the instances of the complex types, wherein the types are described utilizing a formal syntax that allows for definition of the complex types in the type hierarchy. In other words, the type definition component 202 can provide a schema grammar that can be the basis of creating and/or building a schema. The schema grammar can provide a novel technique and/or approach to describe data stored in a file storage system and relationships between the data. It is to be appreciated that the type definition component 202 can provide the schema grammar to support at least one of the following: a declaration of an association between types; a versioning specification; and a content indexing specification.

The type definition component 202 can utilize an interface 204 to facilitate interaction and/or communication with data and/or invoking the schema grammar. For instance, data can be received by the interface 204, wherein the data can include a request that can be from a user and/or a developer. The request can allow the type definition component 202 to provide the schema grammar, which can facilitate generating the schema. In other example, the data can be a response that is related to the schema grammar and/or the schema built. It is to be appreciated that the interface 204 can facilitate the transmission of the schema to be further installed and/or deployed to a data model 206.

The schema can be installed and/or deployed in the data model 206. The data model 206 can be, for instance, a file storage system data model. The file storage system data model 206 can provide at least one of the following: 1) describe the shape of the data stored; 2) declare a constraint to imply certain semantic consistency on data; and/or 3) define semantic associations between data. It is to be appreciated that the data model 206 can enable at least one of storing, finding, and/or relating typical information types stored in a system.

The type definition component 202 can include a grammar component 208 that provides grammar from which a schema can be built. The grammar component 208 can invoke a formal grammar that defines at least one complex type, wherein an instance of the complex type can represent a unit of information. It is to be appreciated that the grammar component 208 can support and/or provide a declaration of an association between types, versioning specifications, and/or content indexing specifications. Although illustrated as incorporated into the type definition component 202, the grammar component 208 can be a separate component, a stand-alone component, and/or a combination thereof.

The type definition component 202 can further include a generator component 210 that can generate a schema based at least in part upon a designer input, a user input, the grammar component, a syntax, . . . . The generator component 210 can build and/or generate the schema such that the schema can be installed and/or deployed in the file storage system data model, a data model, a file storage system, etc. The generator component 210 provides for at least the elimination of manual construction of an API and/or a storage structure, which can reduce development time and code maintenance costs. It is to be appreciated that the generator component 210 can be a stand-alone component in addition to the depiction of being incorporated into the type definition component 202.

Figure 3:
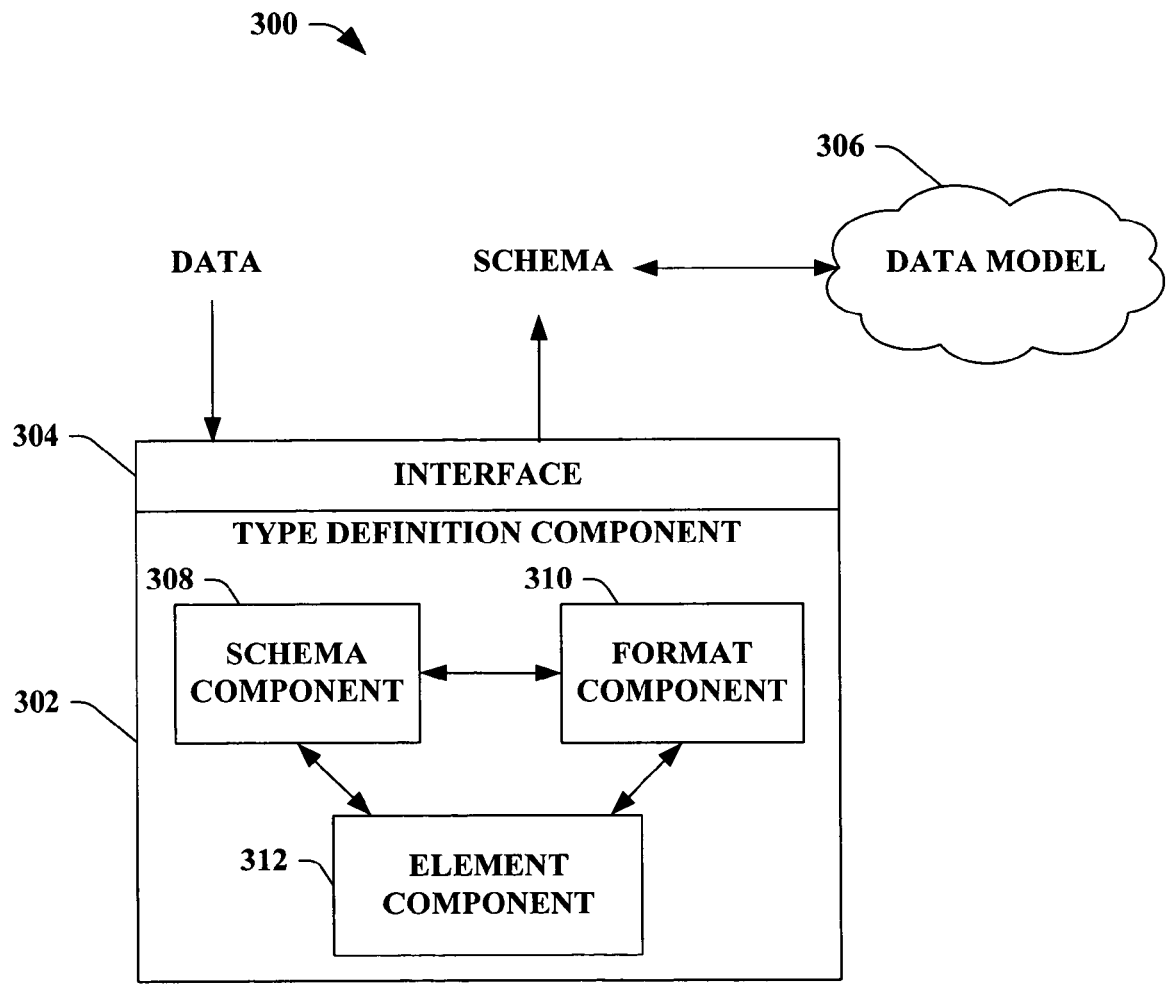
FIG. 3 illustrates a block diagram of an exemplary system that facilitates providing a schema grammar including a schema syntax that can be utilized to generate a schema.

FIG. 3 illustrates a system 300 that facilitates providing a schema grammar that can be utilized to generate a schema. The schema grammar can be provided by a type definition component 302 that provides a declarative mechanism to install a schema into a file storage system (not shown). In other words, the type definition component 302 can provide an abstract description of information types stored in a system, wherein the information types can be represented as instances of complex types. The type definition component 302 further provides the types to be described utilizing the schema grammar that allows for defining the complex types in a type hierarchy. For example, the type definition component 302 can provide the schema grammar to include a declarative type description language for a schema designer to build at least one schema. It is to be appreciated that the type definition component 302 can be substantially similar to the type definition component 202 and 102 as depicted in FIG. 2 and FIG. 1 respectively.

The type definition component 302 can include a schema component 308 that provides at least one definitional concept. For instance, the schema grammar can utilize definition concepts relating to a naming value and/or a property value. The schema component 308 can provide a case sensitive string value, wherein the value is either "true" or "false" to represent a Boolean value. Another concept can include a naming concept used to refer to a schema element such as, but is not limited to, a type, a relationship, a property, etc. In one example, a canonical naming convention can be employed, wherein the name can be a sequence of 1 to 50 UNICODE characteristic. The name can conform to the rules for a common language runtime (CLR) identifier, wherein a name can be a sequence of identifier part characters, the first of which can be an identifier start character. The identifier start character can be one of an alphabetic character, ideographic character, and/or a decimal digit.

Another naming concept implemented by the schema component 308 can relate to naming the schema namespace, wherein the naming concept refers to the schema namespace name and/or reference. The namespace can follow substantially similar rules relating to the naming of schema elements discussed supra. However, the dot character (".") can be a delimiter to the parts of the namespace. The namespace can have a maximum length, for example, 80 characters. The naming concept provided by the schema component 308 can invoke a fully qualified type name of the form [<schema namespace>].<type name>. It is to be appreciated that referring to an element from a schema, the <schemaname>with a dot (".") can be omitted. The schema component 308 can further provide a versioning concept that allows a format for specifying a version of a schema. In one example, the format can be "<major version>.<minor version>.<servicing number>." It is to be appreciated that each part can be an integer value between, for instance, 0 and 32767.

The type definition component 302 can include a format component 310 that provides a format to the schema grammar and/or the schema. For instance, the schema can be represented as an XML document, wherein an XML element can be utilized to define the schema. The format component 310 can provide a namespace for at least one XML element. It is to be appreciated and understood that the namespace can be on a remote system, a local system, and/or a combination thereof. An attribute on a file storage system element is not qualified with a namespace. For instance, an element and/or attribute from another declared namespace can be ignored by the file type storage system. For example, the following pseudo code can be considered valid:

```
<Schema xmlns="http://schemas.microsoft.com/winfs/2003/9/schema"
    Namespace="TestSchema"
    xmlns:smth="http://schemas.microsoft.com/other">
    <Using Namespace="System.Storage" Alias="Base"/>
    <Using Namespace="System.Storage.WinFSTypes"
Alias="WinFSTypes"/>
    <Type Name="TestType01" BaseType="Base.Item"
        smth:customAttribute="Hello">
        <Property Name="ID" Type="WinFSTypes.Int32" />
        <Property Name="Property1" Type="WinFSTypes.String" />
    </Type>
    <smth:CustomElement smth:CustomAttribute="Bye" />
</Schema>.
```

The type definition component 302 can further include an element component 312 that can define and utilize elements that facilitate utilizing the schema grammar to build a schema. For example, the element component 312 can provide an XML document with defined elements. The following can be seen as a particular example that utilizes XML and specific elements; however, any suitable markup language can be employed and specific elements can be modified while providing consistent functionality. A root element of the XML document can be "Schema" that can employ the following attributes, and child element sequence:

TABLE 1

| Attribute Name | Description | Type |
| --- | --- | --- |
| Namespace | Namespace of the schema | SchemaNamespace |
| Alias | Alias used for the namespace in references in the current schema | File Storage System Name |
| Version | Major version of schema | SchemaVersion |
| VersioningClass | Indicates the versioning class of the schema | Library\|Platform |
| PublicKeyToken | The token of the public key of the schema | String(16) |
| anyAttribute | Attributes from other xml schemas | |

TABLE 2

| Parent Elements | None, this is the root element |
| --- | --- |

TABLE 3

| Child Element Sequence | |
| --- | --- |
| Element | Occurrences |
| Documentation | 0:1 |
| Using | 0:n |
| Type | 0:n |
| Enumeration | 0:n |
| Association | 0:n |
| Any | 0:n |

The element component 312 can provide a "Using" element to describe a dependency of the current "Schema." The schemas can utilize an intrinsic type and depend upon the file storage system base schema. It is to be appreciated that the schemas can include "Using" elements for a dependency on file storage system types and bases. The following tables depict attributes, parent elements, and child element sequences in association with the element "Using":

TABLE 4

| Attribute Name | Description | Type |
| --- | --- | --- |
| Namespace | Namespace of the referenced schema | SchemaNamespace |
| Alias | The alias used in schema references in the current schema definition | File Storage System Name |
| Version | Major version of the referenced schema | SchemaVersion |
| anyAttribute | Attributes from other schemas | |

TABLE 5

| Parent Elements | Schema |
| --- | --- |

TABLE 6

| Child Element Sequence | | |
| --- | --- | --- |
| Element | Occurrences | Notes |
| Any | 0:n | Elements from other xml schemas |

Moreover, the element component 312 can invoke a "<Documentation>" element to provide at least one document and/or comment for an XML schema file. For example, there can be two forms of the Documentation element. One form can be a simple element that includes a textual description. Another form can be a more structured form utilized to describe at least one type and an associated property. For instance, the simple form of the Documentation element can have the following attributes, parent elements, and child sequence:

TABLE 7

| Attribute Name | Description | Type |
| --- | --- | --- |
| xsd:anyAttribute | | |

TABLE 8

| Parent Elements | Schema, Type, Property |
| --- | --- |

TABLE 9

| Child Element Sequence | | |
| --- | --- | --- |
| Element | Occurrences | |
| Any | 0:n | Element from other xml namespace |

In another example, the structured form of the documentation element can be as follows:

TABLE 10

| Attribute Name | Description | Type |
|---|---|---|
| xsd:anyAttribute | | |

TABLE 11

| Parent Elements | Schema, Type, Property |
|---|---|

TABLE 12

Child Element Sequence

| Element | Occurrences | |
|---|---|---|
| Summary | 1:1 | Short summary that describes the type or the property |
| LongDescription | 0:1 | Longer text with description of the type or the property |
| SampleValue | 0:n | Sample values for the type or the property |
| Any | 0:n | Element from other xml namespace |

An example of the Documentation element is illustrated below:

```
<Schema Namespace="Vendor.Application.Domain">
  <Documentation>
    Vendors schema for domain of application
  </Documentation>
  <Using Namespace="System.Storage" Alias="WinFS"/>
  <Using Namespace="System.Storage.Contacts" Alias="Contacts"/>
</Schema>.
```

Figure 4:
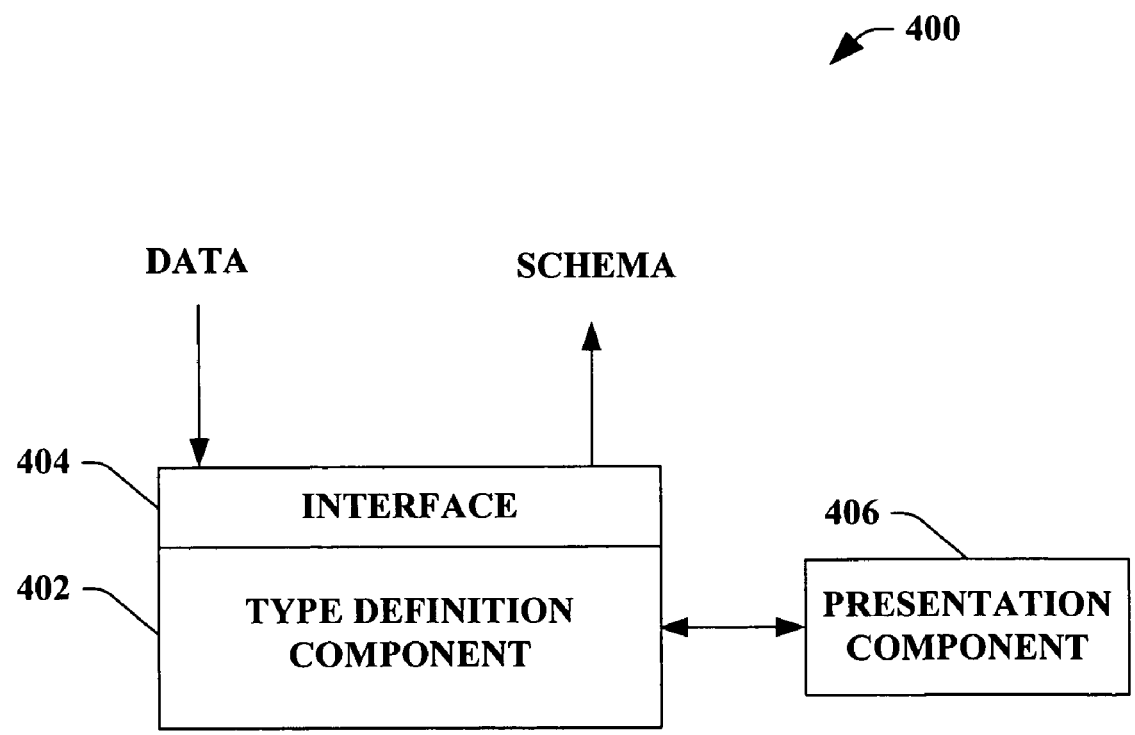
FIG. 4 illustrates a block diagram of an exemplary system that facilitates providing and/or implementing a schema grammar.

FIG. 4 illustrates a system 400 that facilitates employing a schema grammar that can be utilized to build a schema to be installed and/or deployed in a file storage system. A type definition component 402 can provide an abstract description of at least one information type stored. It is to be appreciated that the information type can be represented as an instance of a complex type. The type definition component 402 can describe the type utilizing the schema grammar, which can allow the definition of complex types in a type hierarchy. For instance, the type definition component 402 can provide the schema grammar to include a declarative type description language for a schema designer to build at least one schema to be deployed in the file storage system. It is to be appreciated that the type definition component 402 can be substantially similar to the type definition component 302, 202, and 102 as depicted in FIG. 3, FIG. 2, and FIG. 1 respectively.

A presentation component 406 can provide various types of user interfaces to facilitate interaction between a user and any component coupled to the type definition component 402. As depicted, the presentation component 406 is a separate entity that can be utilized with the type definition component 402. However, it is to be appreciated that the presentation component 406 and/or similar view components can be incorporated into the type definition component 402 and/or a stand-alone unit. The presentation component 406 can provide one or more graphical user interfaces (GUIs), command line interfaces, and the like. For example, a GUI can be rendered that provides a user with a region or means to load, import, read, etc. data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the type definition component 402.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 5:
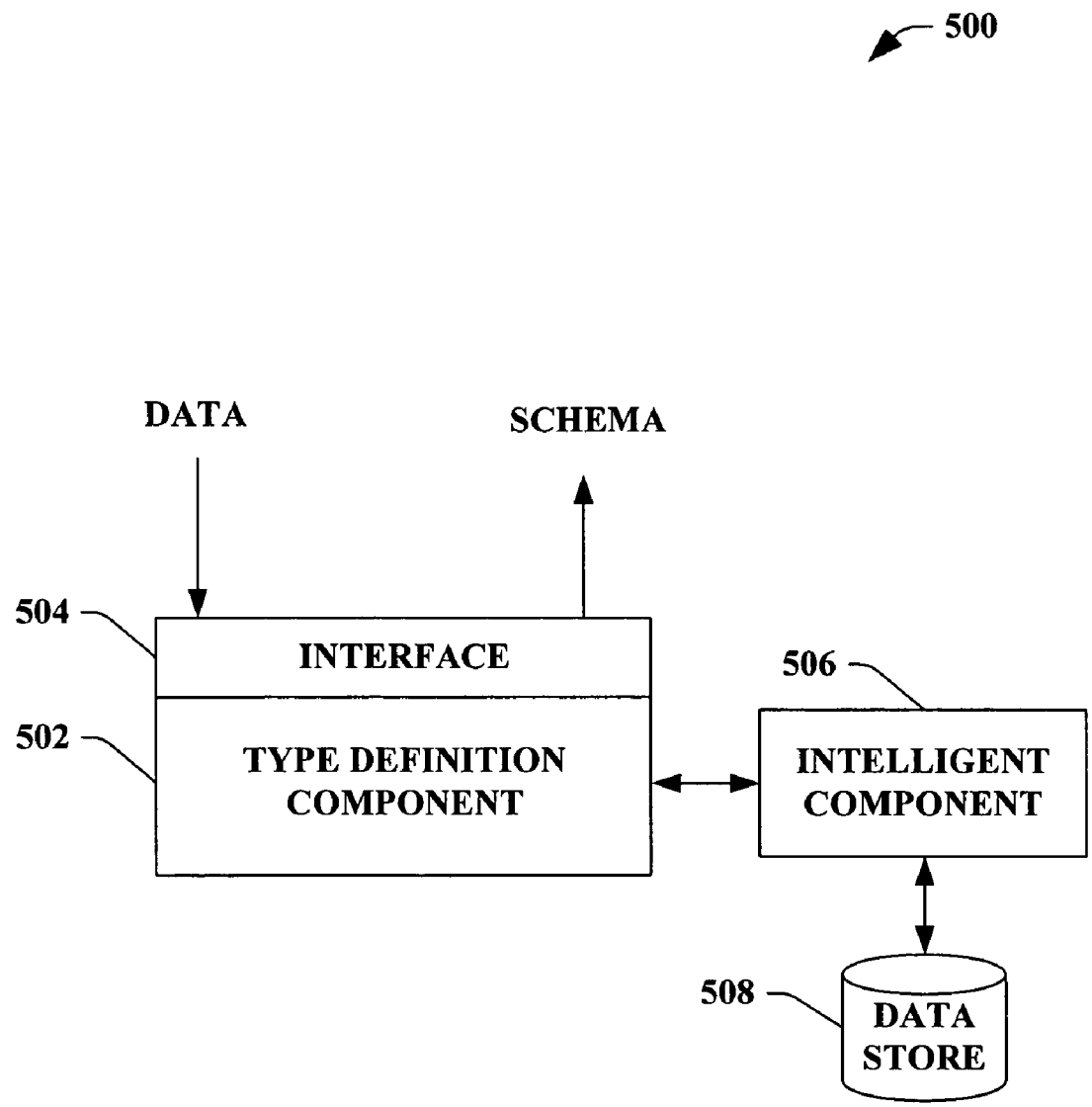
FIG. 5 illustrates a block diagram of an exemplary system that facilitates generating and/or invoking a schema grammar in association with a data model.

FIG. 5 illustrates a system 500 that employs intelligence to facilitate utilizing a schema grammar to build a schema. The system 500 includes a type definition component 502, and an interface 504, which can be substantially similar to the components depicted in earlier figures. The interface 504 can facilitate communication associated to data including a schema, a request, a response, a schema grammar, a selection of schema syntax, etc. The type definition component 502 can provide the schema grammar with at least one of a concept, a format, and/or an element with associated properties/attributes. It is to be appreciated and understood that the type definition component 502 can provide the schema grammar to facilitate creating and/or deploying the schema to a file storage system, a data model, a file storage system data model, etc.

The system 500 further includes an intelligent component 506. The intelligent component 506 can be utilized by the type definition component 502 to facilitate utilizing the schema grammar. For example, the intelligent component 506 can be utilized to facilitate determining a schema grammar to be invoked for a specific developer and/or a file storage system for which the schema is to be built. Historic data in conjunction with a user profile can allow the intelligent component 506 to determine at least one of the following: the schema grammar; a developer habit; a schema typically generated; a file storage system for a particular developer; etc.

It is to be understood that the intelligent component 506 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Furthermore, the intelligent component 506 can utilize a data store 508 to store user profiles and/or historic data. The data store 508 can be, for example, either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 508 of the subject systems and methods is intended to comprise, without being limited to, these and any other suitable types of memory. In addition, it is to be appreciated that the data store 508 can be a server and/or database.

Figure 6:
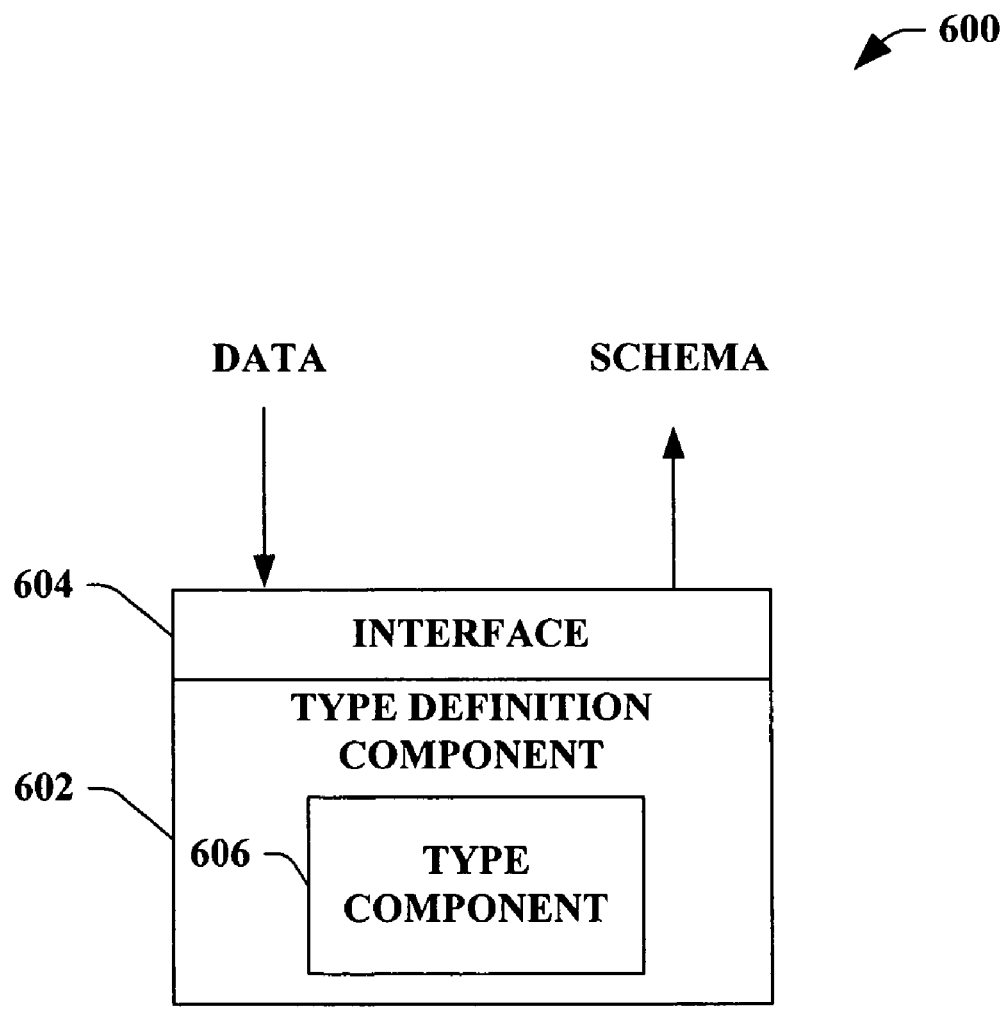
FIG. 6 illustrates a block diagram of an exemplary system that facilitates providing and/or invoking a schema grammar in association with a data model.

FIG. 6 illustrates a system 600 that facilitates providing a schema grammar that can be utilized to generate a schema. The schema grammar can be provided by a type definition component 602 that allows a declarative mechanism to install a schema into a file storage system. The type definition component 602 can describe types utilizing the schema grammar, wherein complex types in a type hierarchy are defined. It is to be appreciated that the type definition component 602 can be substantially similar to the type definition components depicted in previous figures.

The type definition component 602 can include a type component 606 that can declare at least one type related to the schema grammar. The type component 606 can impose a type size limit. In other words, the storage mapping of the schema grammar can be constrained in regards to the size of the type instance. It is to be appreciated that the type size constraint can be enforced to any type declared in the schemas generated by the schema grammar.

The following is an example that can be employed in accordance with the claimed subject matter and is not to be construed as a limitation, whereas any suitable limit can be applied. A LOB type can include a String(max), a Binary (max), a Stream, and/or an XML type. A scalar property can be a property of a scalar type, excluding the LOB type(s). It is to be appreciated that the type component 606 can constrain the type size to the following rule: the sum of the size of all scalar properties of a type must not exceed a number of bytes. For example, the number of bytes can be 7000 bytes.

Furthermore, the type can be mapped to a user defined type (UDT) in a store, wherein a store is a container that can be a physical organizational and manageability unit. It is to be appreciated that a store can represent a root container for a tree of containers. A storage engine can split the UDT into a set of fragments when storing the instance of the UDT. Each fragment should not exceed a storage engine page size (e.g., 8K, etc.), which can include any of the metadata associated with the fragment. The following rules can be applied to define the fragments: 1) all scalar properties of the type form a single fragment, wherein if the type inherits from another type each level in the type hierarchy has a separate fragment for the scalar types defined at that level; and 2) each property of a complex type of LOB type is mapped to a separate fragment.

The type component 606 can implement an EntityType element that declares an Entity Type. The entity type in the file storage system can be a descendant from an Item (e.g., the smallest unit of consistency in the file storage system), a Link (e.g., an entity type that defines an association between two item instances based on an item key), and/or an ItemFragment (e.g., an entity type that can enable declaration of a large collection in item types and item extensions) types. The entity type is a type that is identifiable, wherein the type has a key (identity) that can be utilized to reference an instance of the type. The following tables illustrate attributes, parent elements, and child element sequences for Entity Type:

TABLE 13

| Attribute Name | Description | Type |
| --- | --- | --- |
| Name | Name of the type. Can be unique within the set of all types in the same schema namespace. | File Storage System Name |
| BaseType | The qualified type name of a type that is the base type for this type. If the base type is not declared in the current schema, the schema can be listed in the dependency list (see "Using" discussed supra). | File Storage System FullName |
| VersionIntroduced | The Major version of the schema that introduced the type | SchemaVersion |
| IsCompoundItem | Only applicable to item types. Declares an item type as compound item type. This attributes is applicable for item types with BaseType = 'System.Storage.Item". All other item types inherit the value from their base type. | Boolean |
| anyAttribute | Attributes from other xml schemas | |

TABLE 14

| Parent Elements | Schema |
|---|---|

TABLE 15

Child Element Sequence

| Element | Occurrences | Notes |
|---|---|---|
| Documentation | 0:1 | |
| ChangeUnit | 0:n | |
| Property | 0:n | |
| Any | 0:n | Elements from other xml schemas |

For example, the following can be utilized as depicted above:

```
<Schema Name="System.Storage.Documents">
    <Using Namespace="System.Storage.Contacts"/>
    <EntityType Name="DocumentItem" BaseType="Item">
        <Property Name="Title" Type="String">
            <Length Maximum="100"/>
        </Property>
        <Property Name="Authors" Type="Array(AuthorData)"/>
    </EntityType>
</Schema>.
```

Furthermore, the type component 606 can utilize an InlineType element that can declare an Inline Type. The inline type is a type that does not have identity and can not be referenced. The Inline type can have the following attributes, parent and child elements:

TABLE 16

| Attribute Name | Description | Type |
|---|---|---|
| Name | Name of the type. Can be unique within the set of all types in the same schema namespace. | File Storage System Name |
| BaseType | The qualified type name of a type that is the base type for this type. If the base type is not declared in the current schema, the schema can be listed in the dependency list (see "Using" discussed supra). | File Storage System FullName |
| VersionIntroduced | The Major version of the schema that introduced the type | SchemaVersion |
| anyAttribute | Attributes from other xml schemas | |

TABLE 17

| Parent Elements | Schema |
|---|---|

TABLE 18

Child Element Sequence

| Element | Occurrences | Notes |
|---|---|---|
| Property | 0:n | |
| Any | 0:n | Elements from other xml schemas |

The inline type can be further illustrated by utilizing the following code:

```
<Schema Name="System.Storage.Documents">
    <Using Namespace="System.Storage.Contacts"/>
    <InlineType Name="AuthorData">
        <Property Name="Role" Type="String"/>
        <Property Name="Reference" Type="IdentityReference"/>
    </InlineType>
</Schema>.
```

The type component 606 can implement an enumeration type that declares a set of predefined possible values that can be set on an instance of this type. It is to be appreciated that this can be substantially similar to the notion of enumeration types in CLR. In one example, a "Gender" enumeration type can have two known values: a "Male" or a "Female." The tables proceeding depict characteristics akin to the enumeration type.

TABLE 19

| Attribute Name | Description | Type |
|---|---|---|
| Name | Name of the Enumeration type. Must be unique within the set of all types in the same schema namespace. | File Storage System Name |
| VersionIntroduced | The Major version of the schema that introduced the type | SchemaVersion |

TABLE 20

| Parent Elements | Schema |
|---|---|

TABLE 21

Child Element Sequence

| Element | Occurrences | Notes |
|---|---|---|
| Documentation | 0:1 | Documentation text |
| EnumerationMember | 1:n | List of Enumeration Member declarations |
| Any | 0:n | Elements from other xml schemas |

Moreover, the type component can provide an EnumerationMember element that declares a member of an Enumeration. For instance, the following can be associated to the EnumerationMember.

TABLE 22

| Attribute Name | Description | Type |
|---|---|---|
| Name | Name of the Enumeration Value. Must be unique within the set of all Enumeration Members inside the parent Enumeration declaration. | File Storage System Name |

TABLE 23

| Parent Elements | Enumeration |
|---|---|

TABLE 24

Child Element Sequence

| Element | Occurrences | Notes |
|---|---|---|
| Documentation | 0:1 | Documentation text |
| Any | 0:n | Elements from other xml schemas |

The following code can depict the above:

```
<Schema Name="System.Storage.Contacts" />
    <Enumeration Name="GenderEnum">
        <EnumerationMember Name="Male" />
        <EnumerationMember Name="Female" />
    </Enumeration>
    <EntityType Name="Person" BaseType="Item" >
        <Property Name="FullName" Type="String" />
        <Property Name="Gender" Type="GenderEnum" />
    </EntityType>
</Schema>.
```

The type component 606 can further provide a ChangeUnit element that declares a change unit name with associated ID. The following tables provide attributes, parent elements, and child element sequences.

TABLE 25

| Attribute Name | Description | Type |
|---|---|---|
| Name | Name of the change unit | File Storage System Name |
| Id | The Id of the of the change unit | Int |
| VersionIntroduced | The Version of the schema that introduced the change unit | SchemaVersion (Servicing number must not be included) |
| anyAttribute | | |

TABLE 26

| Parent Elements | ItemType, ExtensionType, RelationshipType |
|---|---|

TABLE 27

Child Element Sequence

| Element | Occurrences | |
|---|---|---|
| Documentation | 0:1 | |
| Any | 0:n | Elements from other xml schemas |

The type component 606 can utilize an EntityExtension element that declares an item extension. In the file storage system, the item types can be extended utilizing this declaration. The item extension concept enables a third-party schema to add structure to an existing item type. The following tables can illustrate EntityExtension.

TABLE 28

| Attribute Name | Description | Type |
|---|---|---|
| Name | Name of the type. Can be unique within the set of all types in the same schema namespace. | File Storage System Name |
| BaseType | Can be "System.Storage.Extension" | File Storage System Name |
| ExtendsType | The qualified type name of a type that is the being extended. The type can be an item type. | File Storage System FullName |
| VersionIntroduced | The Major version of the schema that introduced the type | SchemaVersion |

TABLE 29

| Parent Elements | Schema |
|---|---|

TABLE 30

Child Element Sequence

| Element | Occurrences | Notes |
|---|---|---|
| Documentation | 0:1 | |
| ChangeUnit | 0:n | |
| Property | 0:n | |
| Any | 0:n | Elements from other xml schemas |

The type component 606 can implement a Property element that can define a member property of an ElementType and/or a Relationship. The proceeding tables can depict attributes, parent elements, and child element sequences.

TABLE 31

| Attribute Name | Description | Type |
|---|---|---|
| Name | Name of the property | File Storage System Name |
| Type | One of the following: InlineType Array(InlineType) Set(ItemFragmentType) Ref(ItemType) The schema of the referenced type can be listed as a dependency (See "Using" discussed supra). For File Storage System schemas the only supported occurrences of Ref are in the System.Storage schema, in the Item and Link type definitions. Properties of | File Storage System FullName |

TABLE 31-continued

| Attribute Name | Description | Type |
|---|---|---|
| | Ref type are not allowed in any other File Storage System schema. | |
| Size | Used when type of the property is String or Binary. It specifies the size limit for the values stored in the property. To specify no size limit use the 'max' value | Int32 or literal 'max' |
| Nullable | Property nullability. Not valid for properties of type Array or Set. | File Storage System Bool |
| Default | Default value for the Property | String |
| Precision | The Precision of the property of Decimal type. Can be a value between 1 and 28. This attribute is allowed when Type="FileStorageSystem.Decimal" | Int32 |
| Scale | The Scale of the property of Decimal type Must be a value between 0 and the value of Precision attribute. This attribute is allowed when Type="FileStorageSystem.Decimal" | Int32 |
| ApiAccess | The desired level of API access for the property. Applications can read and write values of properties with ApiAccess=ReadWrite Applications can only read the value of properties with ApiAccess=ReadOnly Applications can not read nor write values of properties with ApiAccess=Private. | ReadWrite\| ReadOnly\| Private |
| VersionIntroduced | The version of the schema that introduced the property | SchemaVersion |
| ChangeUnit | The name of the change unit to which the property belongs. This is valid for Properties of Item, Extension and Relationship types. This attribute is not allowed on properties of Nested Types. | File Storage System Name |
| anyAttribute | | |

TABLE 32

| Parent Elements | Type, Relationship |
|---|---|

TABLE 33

Child Element Sequence

| Element | Occurrences | |
|---|---|---|
| Documentation | 0:1 | |
| Any | 0:n | Elements from other xml schemas |

The following code can depict the above.

```
<Schema Namespace="System.Storage.Contacts" >
    <Using Namespace="System.Storage" Alias="WinFS" />
    <EntityType Name="Document" BaseType="WinFS.Item">
        <Property Name="Comments" Type="WinFS.String"
            Size="50" Nullable="true"/>
        <Property Name="ContentType" Type="Category" />
    </EntityType>
    <InlineType Name="Category" >
        <Property Name="Category" Type="WinFSTypes.String"
            Size="50" Nullable="true"/>
        <Property Name="Documentation" Type="WinFSTypes.String"
            Size="max" Nullable="true"/>
    </InlineType>
</Schema>.
```

The type component 606 can further invoke default value support in the schema. A scalar property and Enumeration type properties in the file storage system schema can be assigned "Default" values at the type instance creation. The default values can be specified declaratively as part of the property declaration in the schema definition. The syntax for declaring a "Default" value for a property can, for example, look like the following:

```
<Property Name="Priority" Type="WinFSTypes.int" Default="0">
<Property Name="PhoneType" Type="WinFSTypes.String"
    Size ="32" Default=""Work"" />
```

For example, the following rules and restrictions can apply for the default value declarations: 1) default value can be a constant value, it cannot be function or an expression; 2) default values are supported on scalar and enumeration type properties; 3) a character or a date constant must be enclosed in single quotation marks; 4) default values are set when the instance of the type is created; 5) File Storage System does not support setting a property back to its default value after it has been created; 6) default format for datetime type default value is "MM/DD/YYYY hh:mm:ss AM(or PM)," a shorter string may be provided in order to perhaps eliminate the time portion or for other reasons; 7) for properties of type "Boolean," valid default value can be either "true" or "false" (case sensitive); and 8) for properties of type "Enumeration," valid default values are the fully qualified names of the enumeration members—for example:
System.Storage.Contact.Gender.Male.

The type component 606 can employ a PropertyConstraint that allows the definition of constraints on a property. A property is a member field of the type and is defined by a name and a declared type. In file storage system schemas, this element can be utilized on a SourceRef and/or TargetRef property of the link types. The following tables can be utilized with PropertyConstraint.

TABLE 34

| Attribute Name | Description | Type |
|---|---|---|
| Property | Name of the property (SourceRef or TargetRef) | File Storage System Name |
| Type | Can be a Ref<Type>. The type that is reference must be a subtype of the type referenced in the original constraint for the same property. | |

TABLE 35

| Parent Elements | EntityType |
|---|---|

TABLE 36

| Child Element Sequence | | |
|---|---|---|
| Element | Occurrences | |
| Documentation | 0:1 | |
| Any | 0:n | Elements from other xml schemas |

Figure 7:
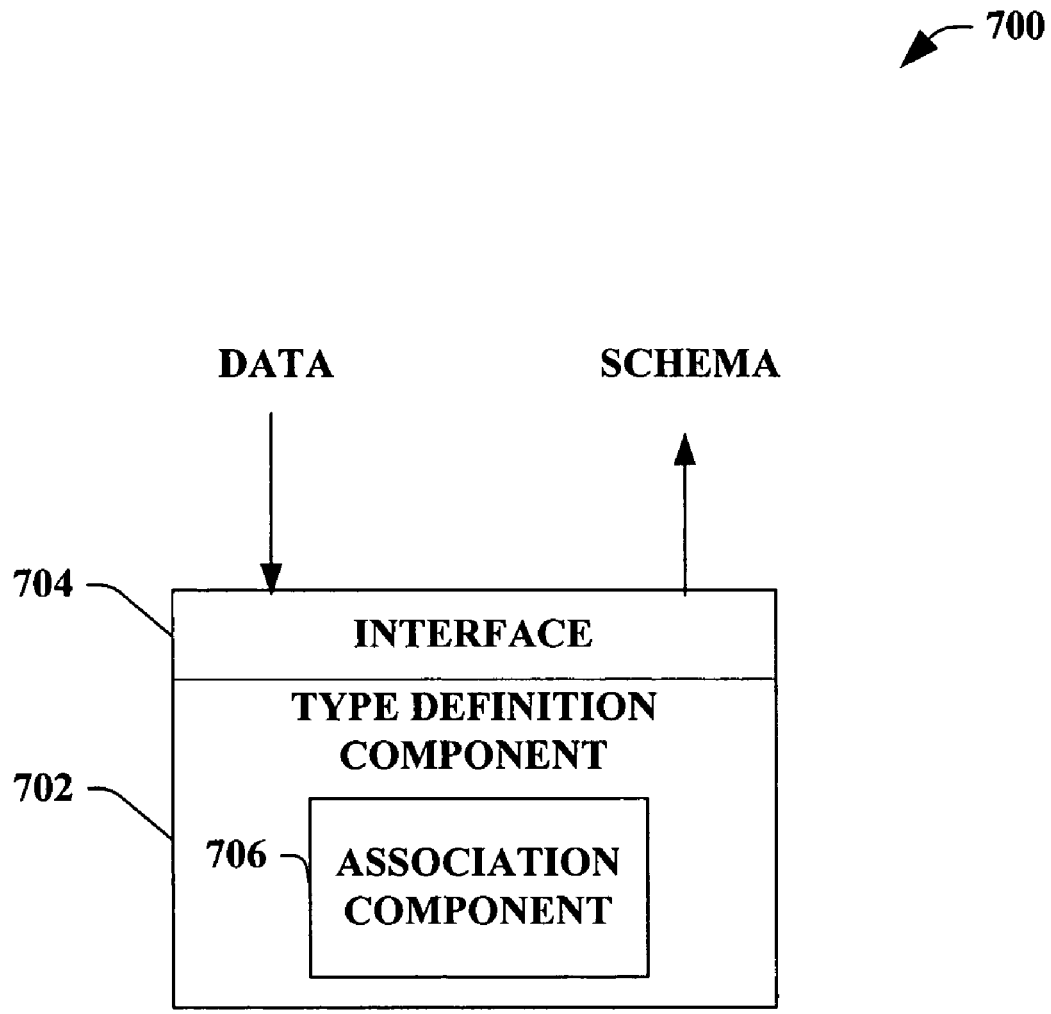
FIG. 7 illustrates a block diagram of an exemplary system that facilitates providing and/or implementing a schema grammar.

FIG. 7 illustrates a system 700 that facilitates providing a schema grammar that can be utilized to generate a schema. The schema grammar can be provided by a type definition component 702 that allows a declarative mechanism to install a schema into a file storage system. The type definition component 702 provides the types to be described utilizing the schema grammar to define the complex types in a type hierarchy. It is to be appreciated that the type definition component 702 can be substantially similar to the type definition components depicted in previous figures.

The type definition component 702 can include an association component 706 to support declaration of associations (e.g., relationships) between types. The association component 706 can implement an association element that can declare an association. The association component 706 can declare a relationship between items. The relationships can be based at least in part upon a link type and/or a common value of items. Each item involved in an association has a role. The items can be referenced as the ends of the association. It is to be appreciated that an association can declare multiple ends. The following table depicts attributes.

TABLE 37

| Attributes | | |
|---|---|---|
| Attribute Name | Description | Type |
| Name | Name of the association | File Storage System Name |
| anyAttribute | | |

For example, there can be four forms of association syntax: 1) common value association, 2) condition association, 3) reference association and 4) association entity, which can differ by their semantic and/or allowed child elements.

The association component 706 can provide an End element that declares an end type that participates in the association. The following table illustrates attributes and other characteristics.

TABLE 38

| Attributes | | |
|---|---|---|
| Attribute Name | Description | Type |
| Role | Role of the end | File Storage System Name |
| PluralRole | | File Storage System Name |
| Type | Type of the end. Can be an entity type. | File Storage System Name |
| anyAttribute | | |
| Parent Elements | Association, AssociationEntity | |
| Child Element Sequence | | |
| Element | Occurrences | |
| Documentation | 0:1 | |
| Any | 0:n | Elements from other xml schemas |

The association component 706 can provide a condition association that declares an association between two entities that is based on a condition expression. The condition element declares the condition in a condition based association. For example, the following child elements for the condition association can be:

TABLE 39

| Child Element Sequence | | |
|---|---|---|
| Element | Occurrences | |
| Documentation | 0:1 | |
| End | 2:2 | |
| Using | 0:n | |
| Condition | 1:1 | |
| Any | 0:n | Elements from other xml schemas |

The association component 706 can provide syntax of the condition element as a child of the Association element. For example, the following syntax can be implemented:

TABLE 40

| Attributes | | |
|---|---|---|
| Attribute Name | Description | Type |
| anyAttribute | | |
| Parent Elements | Association | |
| Child Element Sequence | | |
| Element | Occurrences | |
| Text | 1:1 | Common Value OPath expression |
| Any | 0:n | Elements from other xml schemas |

The association component 706 can provide a using element that declares a type with a role that is utilized in the condition expression but is not considered as an end in the association. The following syntax can be employed for the Using element.

TABLE 41

| Attributes | | |
|---|---|---|
| Attribute Name | Description | Type |
| Role | | File Storage System Name |
| Type | Must be an entity type. | File Storage System Name |
| anyAttribute | | |
| Parent Elements | | Association, AssociationEntity |

| Child Element Sequence | | |
|---|---|---|
| Element | Occurrences | |
| Any | 0:n | Elements from other xml schemas |

The following code can depict the above:

```
<Schema Namespace="MySchema">
    <EntityType Name="A" BaseType="Item">
        <Property Name="ID" Type="Int32"/>
        <Property Name="X" Type="Int32"/>
    </EntityType>
    <EntityType Name="B" BaseType="Item">
        <Property Name="ID" Type="Int32"/>
        <Property Name="Y" Type="Int32"/>
    </EntityType>
    <Association Name="AB">
        <End Role="ARole" Type="A"/>
        <End Role="BRole" Type="B" />
        <Condition>
            ARole.X = BRole.Y
        </Condition>
    </Association>
</Schema>.
```

The association component 706 can implement a common value association that declares an association between two entities that is based on common value of their properties. The common value association is a simplified version of the condition based association where the condition is an equality of two properties. The following are the child elements of the condition association.

TABLE 42

| Child Element Sequence | | |
|---|---|---|
| Element | Occurrences | |
| Documentation | 0:1 | |
| End | 2:2 | |
| CommonValue | 1:1 | |
| Any | 0:n | Elements from other xml schemas |

The association component 706 can employ a CommonValue element that declares a common value association. The following tables can illustrates the CommonValue.

TABLE 43

| Attributes | | |
|---|---|---|
| Attribute Name | Description | Type |
| Property1 | Scalar property of an entity type | File Storage System Name |
| Property2 | Scalar property of an entity type | File Storage System Name |

TABLE 43-continued

| anyAttribute | | |
|---|---|---|
| Parent Elements | | Association, AssociationEntity |

| Child Element Sequence | | |
|---|---|---|
| Element | Occurrences | |
| Any | 0:n | Elements from other xml schemas |

The following code can depict the above:

```
<Schema Namespace="MySchema">
    <EntityType Name="A" BaseType="Item">
        <Property Name="ID" Type="Int32"/>
        <Property Name="X" Type="Int32"/>
    </EntityType>
    <EntityType Name="B" BaseType="Item">
        <Property Name="ID" Type="Int32"/>
        <Property Name="Y" Type="Int32"/>
    </EntityType>
    <Association Name="AB">
        <End Role="ARole" Type="A"/>
        <End Role="BRole" Type="B" />
        <CommonValue Property1="ARole.ID" Property2="BRole.ID"/>
    </Association>
</Schema>.
```

The association component 706 can further provide a reference association that declares an association between two entities that is based on property of reference type. The property references an instance of the type declared in the other end of the association. The following are the child elements for a reference association.

TABLE 44

| Child Element Sequence | | |
|---|---|---|
| Element | Occurrences | |
| Documentation | 0:1 | |
| End | 2:2 | |
| Reference | 1:1 | |
| Any | 0:n | Elements from other xml schemas |

The following is an example of a syntax of the reference element.

TABLE 45

| Attributes | | |
|---|---|---|
| Attribute Name | Description | Type |
| Property | | |
| FromRole | | |
| ToRole | | |
| anyAttribute | | |
| Parent Elements | | Association, AssociationEntity |

| Child Element Sequence | | |
|---|---|---|
| Element | Occurrences | |
| Any | 0:n | Elements from other xml schemas |

The following code can invoke the above:

```
<Schema Namespace="MySchema">
    <EntityType Name="A" BaseType="Item">
        <Property Name="BRef" Type="Ref(B)"/>
        <Property Name="X" Type="Int32"/>
    </EntityType>
    <EntityType Name="B" BaseType="Item">
        <Property Name="ID" Type="Int32"/>
        <Property Name="Y" Type="Int32"/>
    </EntityType>
    <Association Name="AB">
        <End Role="ARole" Type="A"/>
        <End Role="BRole" Type="B" />
        <Reference Property="ARole.BRef"
            FromRole="ARole" ToRole="BRole">
    </Association>
</Schema>.
```

The association component 706 can provide an association entity association that declares association between two or more ends. An entity type (e.g., the association entity can be utilized to relate each pair of ends. The following tables depict the child elements of a condition association.

TABLE 46

Child Element Sequence

| Element | Occurrences | |
|---|---|---|
| Documentation | 0:1 | |
| End | 2:n | |
| AssociationEntity | 1:1 | |
| Any | 0:n | Elements from other xml schemas |

The association component 706 can provide an AssociationEntity element that declares the entity that establishes the associations between the association ends. The following table describes the attributes, parent elements, and child element sequences.

TABLE 47

Attributes

| Attribute Name | Description | Type |
|---|---|---|
| Type | The type of the association entity. Can be a link type | File Storage System Name |
| Role | | |
| PluralRole | | |
| anyAttribute | | |
| Parent Elements | Association | |

Child Element Sequence

| Element | Occurrences | |
|---|---|---|
| Using | 0:n | |
| Condition | 0:n | |
| CommonValue | 0:n | |
| Reference | 0:n | |
| Any | 0:n | Elements from other xml schemas |

It is to be appreciated that the sum of the number of Condition, CommonValue, and Reference elements can be substantially similar to the number of ends in the association. Each condition, CommonValue, and/or Reference element can match a single End element and describe how that end is related to the association entity.

The following illustrates a syntax of the Condition element when utilized as a child of the AssociationEntity element.

TABLE 48

Attributes

| Attribute Name | Description | Type |
|---|---|---|
| JoinedRoles | List of roles used in the condition. Can include the association entity role | |
| anyAttribute | | |
| Parent Elements | AssociationEntity | |

Child Element Sequence

| Element | Occurrences | |
|---|---|---|
| Text | 1:1 | Common Value OPath expression |
| Any | 0:n | Elements from other xml schemas |

The following code can depict the above:

```
<Schema Namespace="MySchema">
    <EntityType Name="A" BaseType="Item">
        <Property Name="ID" Type="Int32"/>
        <Property Name="X" Type="Int32"/>
    </EntityType>
    <EntityType Name="B" BaseType="Item">
        <Property Name="ID" Type="Int32"/>
        <Property Name="Y" Type="Int32"/>
    </EntityType>
    <EntityType Name="L" BaseType="Link">
        <PropertyConstraint Property="SourceRef" Type="Ref(A)"/>
        <PropertyConstraint Property="TargetRef" Type="Ref(B)"/>
    </EntityType>
    <Association Name="AB">
        <End Role="ARole" Type="A"/>
        <End Role="BRole" Type="B" />
        <AssociationEntity Type="L" Role="L" >
            <Reference Property="SourceRef" FromRole="L"
                ToRole="ARole"/>
            <Reference Property="TargetRef" FromRole="L"
                ToRole="BRole"/>
        </AssociationEntity>
    </Association>
</Schema>.
```

Figure 8:
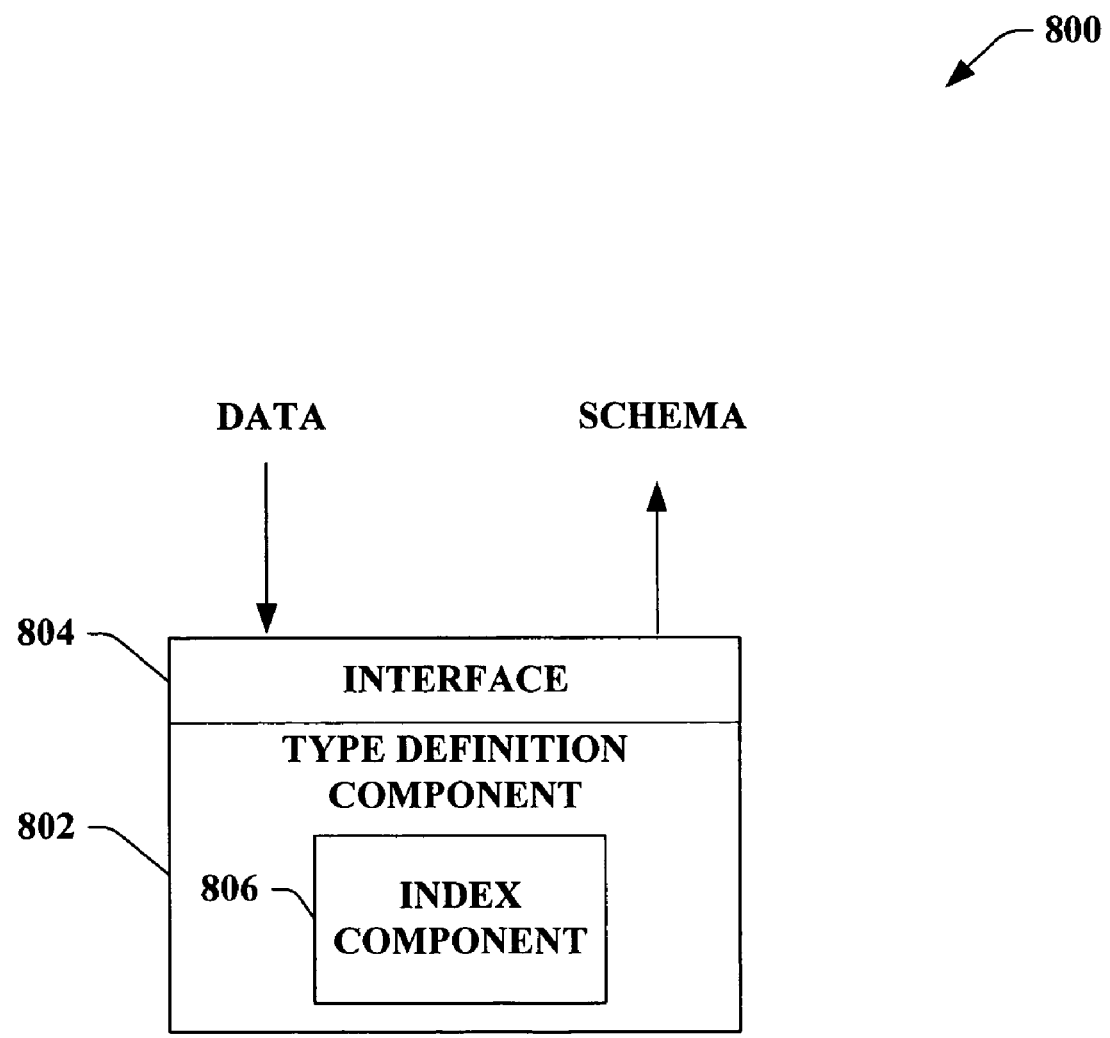
FIG. 8 illustrates a block diagram of an exemplary system that facilitates generating and/or utilizing a schema grammar.

FIG. 8 illustrates a system 800 that facilitates employing a schema grammar that can be utilized to build a schema to be installed and/or deployed in a file storage system. A type definition component 802 can provide an abstract description of at least one information type stored. It is to be appreciated that the information type can be represented as an instance of a complex type. The type definition component 802 can describe the type utilizing the schema grammar, which can allow the definition of complex types in a type hierarchy. For instance, the type definition component 802 can provide the schema grammar to include a declarative type description language for a schema designer to build at least one schema to be deployed in the file storage system. It is to be appreciated that the type definition component 802 can be substantially similar to the type definition component previously depicted.

The type definition component 802 can provide an index component 806 to facilitate supporting a content indexing specification. The index component 806 can provide a ContentIndex element that can declare a content index on at least one file storage system property. The content index can be declared on the properties of an Item, an Extension, and/or a Relationship type. It is to be appreciated that the content index can be declared on properties in an Inline type and/or an ItemFragment type, when the Inline type and/or ItemFragment type is utilized inside the Item, Extension, and/or Relationship type. The ContentIndex element can contain zero or more ContentIndexField declarations, zero or more ContentIndexInlineField, or zero or more ContentIndexItemFragmentField declarations. The following tables can depict attributes, parent elements, and child element sequences of ContentIndex.

TABLE 49

| Attributes | | |
|---|---|---|
| Attribute Name | Description | Type |
| Name | A name for the content index grouping | File Storage System Name |
| Type | Name of the Item/Relationship/Extension type on which the content index is defined. | File Storage System Name |
| Parent Elements | | Schema |

| Child Element Sequence | | |
|---|---|---|
| Element | Occurrences | Notes |
| Documentation | 0:1 | Documentation |
| ContentIndexField | 0:n | Specifies a property on which the content index is defined. The property has to be of File storage system type 'string' or 'binary' |
| ContentIndexInlineField | 0:n | Specifies an Inline Type property on which the content index is defined. |
| ContentIndexItemFragment Field | 0:n | Specifies an Item Fragment Type property on which the content index is defined. |
| Any | 0:n | Elements from other xml schemas |

For example, the following code can depict the above:

```
<ContentIndex Name="ContentIndexPersonFields"
    Type="Core.Person">
```

The index component 806 can provide a ContentIndexField element to specify a property that is to be full text (FT) indexed. It is to be appreciated that this can be implemented when the property to be FT indexed is not an inline/item fragment type, but a scalar property on the Type. The following table illustrate characteristics of ContentIndexField.

TABLE 50

| Attributes | | |
|---|---|---|
| Attribute Name | Description | Type |
| Property | Name of the property that is to be FT Indexed. Property has to be a top level property on the Type. It should be a scalar property, NOT an inline type property. It should be a property defined by this Type, not a property inherited from the Base Type. | File Storage System Name |
| Parent Elements | | ContentIndex |

| Child Element Sequence | | |
|---|---|---|
| Element | Occurrences | Notes |
| Documentation | 0:1 | Documentation |
| Any | 0:n | Elements from other xml schemas |

The following example depicts the above:

```
<ContentIndexField Property="Name"/>
```

The index component 806 can provide a ContentIndexInlineField that can specify a property that is to be FT indexed. This can be utilized when the property to be FT indexed is an inline type. The following tables can depict such characteristics:

TABLE 51

| Attributes | | |
|---|---|---|
| Attribute Name | Description | Type |
| Property | Name of the property that is to be FT Indexed. Property has to be of an inline type. It should be a property defined by this Type, not a property inherited from the Base Type | File Storage System Name |
| AsInlineType | Name of the Inline Type that the 'Property' above should be indexed as. This could be a derived type of the Inline type specified in the definition of 'Property'. This allows for Inline type substitutability (See example below) | File Storage System Name |
| Parent Elements | ContentIndex | |

| Child Element Sequence | | |
|---|---|---|
| Element | Occurrences | Notes |
| ContentIndexField | 0:n | Specifies a scalar property within this Inline type on which the content index is defined. |
| ContentIndexInlineField | 0:n | Specifies an Inline property within this Inline type on which the content index is defined. This allows for indexing fields nested at any level of depth under the Item Type |
| Any | 0:n | Elements from other xml schemas |

If there is a "ContentIndexInlineField . . . as Type . . . " specified, but no ContentIndexField child/grandchild/ . . . for this ContentIndexInlineField node (e.g., there is no scalar property specified at the end of this Inline type chain), then a failure at schema installation time can appear when the content index specification is parsed. This is because ultimately a scalar property inside the inline type must be specified for indexing. Furthermore, a ContentIndexInline Field cannot have a ContentIndexItemFragment field as a child because Inline types can not contain item fragments. Only Item types can declare set properties and ItemFragments can only appear in Sets. The following code can depict the above.

```
<ContentIndexInlineField Property="homeAddresses"
    AsInlineType="Address">
    <ContentIndexField Property="street"/>
    <ContentIndexField Property="city"/>
</ContentIndexInlineField>
```

If a new sub-type of the Address Inline Type called USAddress is added that defines a property called "zip," a content index can be defined on the 'zip' field of those instances of Person.homeAddresses that are of Type USAddress, as illustrated below.

```
<ContentIndexInlineField Property="homeAddresses"
    AsInlineType="USAddress">
    <ContentIndexField Property ="zip"/>
</ContentIndexInlineField>
```

The following is a complete syntax example:

```
<ContentIndex Name="content index name"
        Type="item type | relationship type | extension type">
    <ContentIndexField Property="prop name1"/>
    <ContentIndexInlineField Property="prop name2"
            AsInlineType="Inline type1">
        <ContentIndexField Property="prop name3"/>
        <ContentIndexInlineField Property="prop name4"
                AsInlineType="Inline type2">
            <ContentIndexField Property="prop name5"/>
            .
            .
            .
        </ContentIndexInlineField>
    </ContentIndexInlineField>
    .
    .
    .
</ContentIndex>.
```

Thus, when the content index is specified on the property in the inline type, the specification can start from the top-level Item/Extension/Relationship type inside which this Inline type is used.

The index component 806 can provide a ContentIndexItemFragmentField element to specify a property that is to be FT Indexed. This can be utilized when the property to be FT Indexed is of an item fragment type. The following table can provide characteristics of ContentIndexItemFragmentField.

TABLE 52

| Attributes | | |
|---|---|---|
| Attribute Name | Description | Type |
| Property | Name of the property that is to be FT Indexed. Property has to be of an item fragment type. It should be a property defined by this Type, not a property inherited from the Base Type | File Storage System Name |
| AsItemFragmentType | Name of the item fragment Type that the 'Property' above should be indexed as. This could be a derived type of the item fragment type specified in the definition of 'Property'. This allows for item fragment type substitutability. | File Storage System Name |
| Parent Elements | ContentIndex | |

| Child Element Sequence | | |
|---|---|---|
| Element | Occurrences | Notes |
| ContentIndexField | 0:n | Specifies a scalar property within this Inline type on which the content index is defined. |
| ContentIndexInlineField | 0:n | Specifies an Inline property within this Inline type on which the content index is defined. This allows for indexing fields |

TABLE 52-continued

| | | |
|---|---|---|
| Any | 0:n | nested at any level of depth under the Item Type Elements from other xml schemas |

If there is a "ContentIndexItemFragmentField . . . as Type . . . " specified, but there is no ContentIndexField child for this ContentIndexItemFragmentField node (e.g., there is no scalar property specified at the end of this item fragment type chain), then a failure at schema installation time is employed when the content index specification is parsed. This is because a scalar property inside the inline type is specified for indexing. Furthermore, a ContentIndexItemFragment Field cannot have another ContentIndexItemFragment field as child because Item fragments can not contain item fragments. Only Item types can declare set properties and ItemFragments can only appear in Sets.

The following is an example of a declaration and usage of an ItemFragment entity type:

```
<EntityType Name="Participant"
        BaseType="System.Storage.ItemFragment" >
    <Property Name="DisplayName" Type="Name" />
    <Property Name="ParticipantAddress" Type="EAddress" />
</EntityType>
<EntityType Name="MessageItem" BaseType="Item" >
    <Property Name="Subject" Type="String" />
    <Property Name="Participants" Type="Set(Participant)"
            SetId="12345" />
</EntityType>
```

The content index specification for Participant is as follows (e.g., EAddress also has a DisplayName property which is to be FT Indexed):

```
<ContentIndex Name="ParticipantContentIndex"
        Type="item type">
    <ContentIndexItemFragmentField Property="Participants"
            AsItemFragmentType="Participant">
        <ContentIndexField Property="DisplayName"/>
        <ContentIndexInlineField Property="ParticipantAddress"
                AsInlineType="EAddress">
            <ContentIndexField Property="DisplayName"/>
            .
            .
            .
        </ContentIndexInlineField>
    </ContentIndexItemFragmentField>
    .
    .
    .
</ContentIndex>.
```

Thus when a content index is specified on a property in an item fragment type, the specification should start all the way from the top-level Item type inside which this item fragment type is used.

The index component 806 can provide usage rules involving content indexing specification. For example, the following rules can be employed: 1) File storage system content indexes can be defined on any Item, Relationship or Extension types (or their derived types). The "Type" attribute of a ContentIndex declaration cannot be an inline type or item fragment type; 2) ContentIndexField can refer to a scalar property; 3) The 'Property' attribute of ContentIndexField and ContentIndexInlineField can be a property defined by the Item/Extension/Relationship or Inline/item fragment Type, not a property that this Item/Extension/Relationship or Inline/item fragment Type inherited from any of its parent Types; 4) ContentIndex syntax differs from the regular index syntax by providing Inline Type Substitutability (e.g., Specifying regular indexes on fields that could be defined by derived types of a InlineType is not supported) and/or more than one-level of nesting (e.g., Specifying regular indexes on a field that is an inline field inside an inline type (or greater than 1 level of nesting) is not supported). However, these are supported for content indexing. Content indexing is done asynchronously, it makes it easier to support Inline type substitutability; and 5) A ContentIndex element must be declared in the same schema as the one where the indexed top-level Item/Extension/Relationship Type is introduced. This restriction does not hold for Inline types.

The index component 806 can further provide recommendations. For Inline types, ContentIndex should be specified in the schema where the Inline type is used. For cross-schema indexing, where a Inline type defined in one schema is used in a different schema, say schema-2, create a third schema and specify the index there (e.g., to avoid referencing external schema (schema-1) in schema-2 for content-indexing purposes). There can be one ContentIndex XML fragment per item type definition in the schema, unlike the regular index specification where there is an Index XML fragment for each different index (simple or compound) specified. There is no need for a separate XML element to distinguish between multi-valued and single-valued usages of an inline type. The ContentIndexInlineField element can be used for both cases. Thus, there is no equivalent to the IndexCollection element for regular indexes. A multi-valued field is currently content indexed as a single property and the content index search has to always be over all the values of the multi-valued property.

Figure 9:
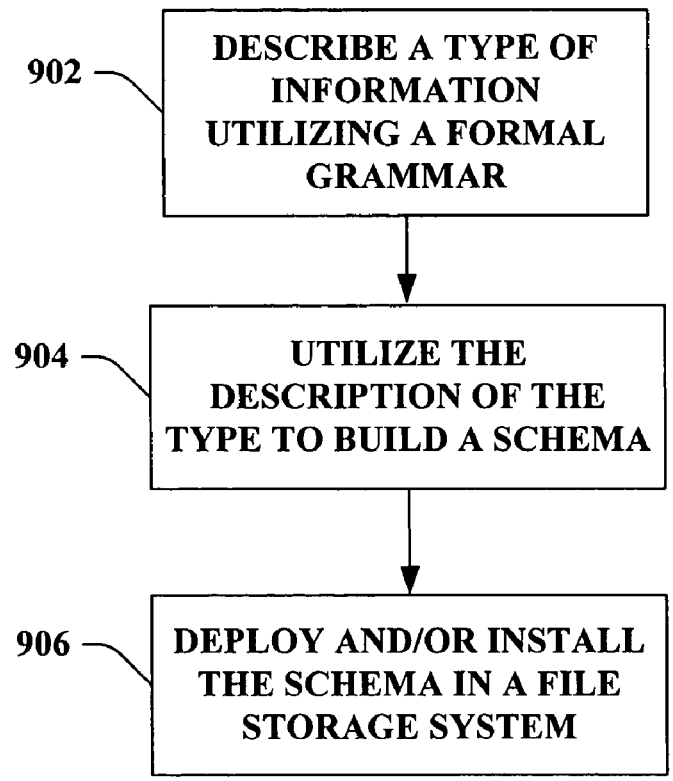
FIG. 9 illustrates an exemplary methodology for providing and/or invoking a schema grammar in association with a data model.
Figure 10:
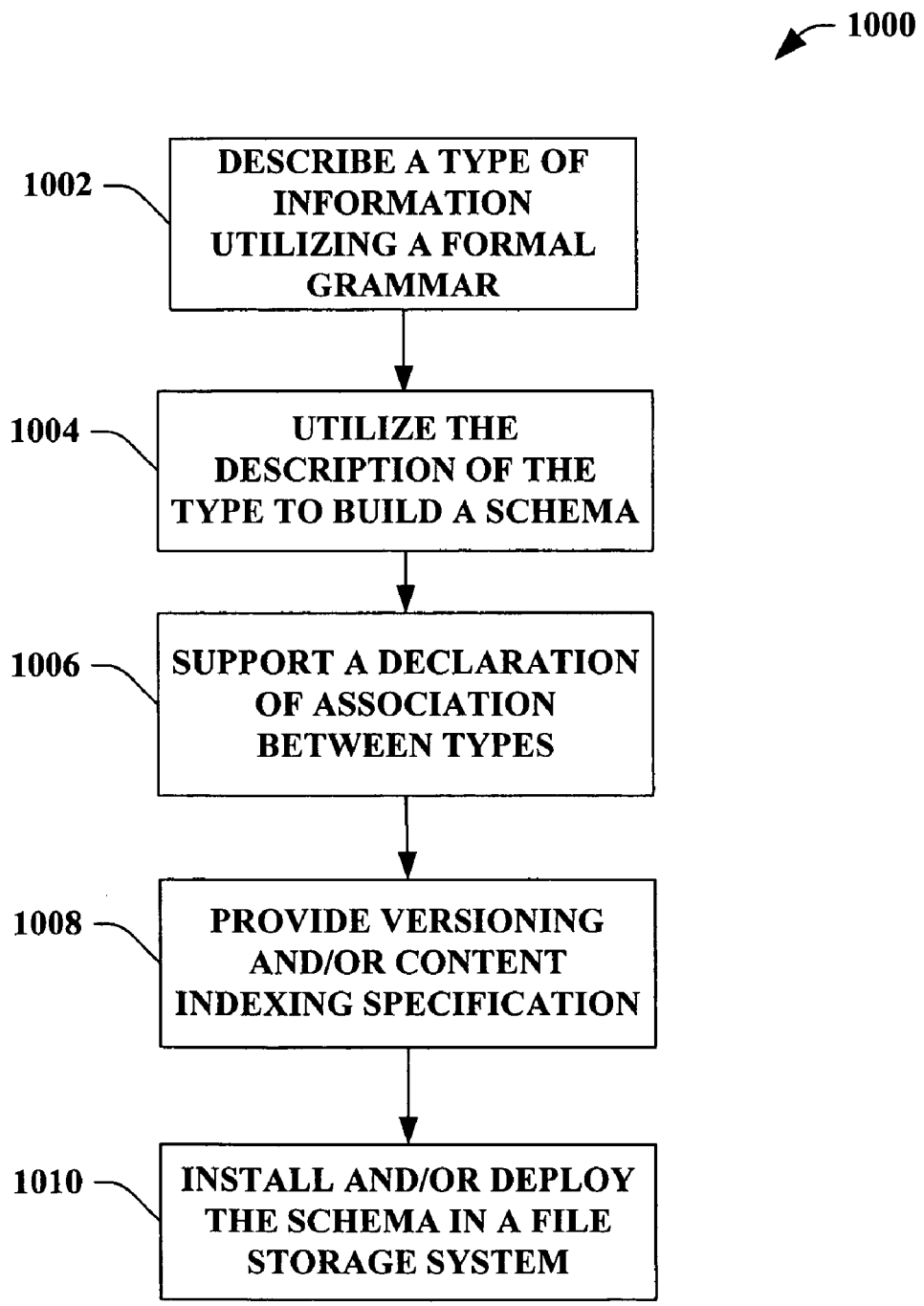
FIG. 10 illustrates an exemplary methodology for creating and/or employing a schema grammar in association with a data model.

FIGS. 9-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 9 illustrates a methodology 900 for providing and/or invoking a schema grammar in association with a data model. The schema grammar can be a computer program language vocabulary that has formally defined syntax relating to a data model for which such schema can be installed and/or deployed. For instance, a type can be declared in the schema, wherein each schema can define a namespace to serve as a logical grouping for a set of types and/or other schema elements. Typical information type stored can be a document, an image, music, a video, a contact, a message, etc. These units of information can be represented as instances of complex types that are part of a type system that supports inheritance. At reference numeral 902, the type of information can be described utilizing a formal grammar to define a complex type in a type hierarchy. The formal grammar can allow an abstraction of the types of information. At reference numeral 904, the description of the type can be utilized to build and/or create a schema. In other words, the schema grammar can be utilized to generate a schema, wherein the schema grammar (e.g., utilizing the schema syntax) can provide a description of data stored and relationships associated therewith. At reference numeral 906, the schema generated and/or built can be installed and/or deployed in a file storage system. It is to be appreciated that the file storage system can include a type system utilizing a class hierarchy and/or inheritance.

FIG. 10 illustrates a methodology 1000 that facilitates providing and/or invoking a schema grammar in association with a data model. At reference numeral 1002, a type of information can be described utilizing a formal grammar. For example, information such as, but not limited to, documents, images, music, video, contacts, messages, etc. The description can be abstract so as to allow for definition of complex types in a type hierarchy. At reference numeral 1004, the description can be utilized to build a schema. The schema is built utilizing the guidelines and/or rules of the formal grammar.

At reference numeral 1006, the grammar can support a declaration of association between at least two types. For instance, there can be four forms of association syntax such as: 1) common value association; 2) condition association; 3) reference association; and 4) association entity. Turning to reference numeral 1008, a versioning and/or a content indexing specification can be provided. The versioning can provide verification, authentication, and compatibility. The content indexing specification can provide support for content indexing in relation to the schema grammar, and the schema built. At reference numeral 1010, the schema is deployed and/or installed in a file storage system. It is to be appreciated that the file storage system can include a class type hierarchy and/or inheritance.

Figure 11:
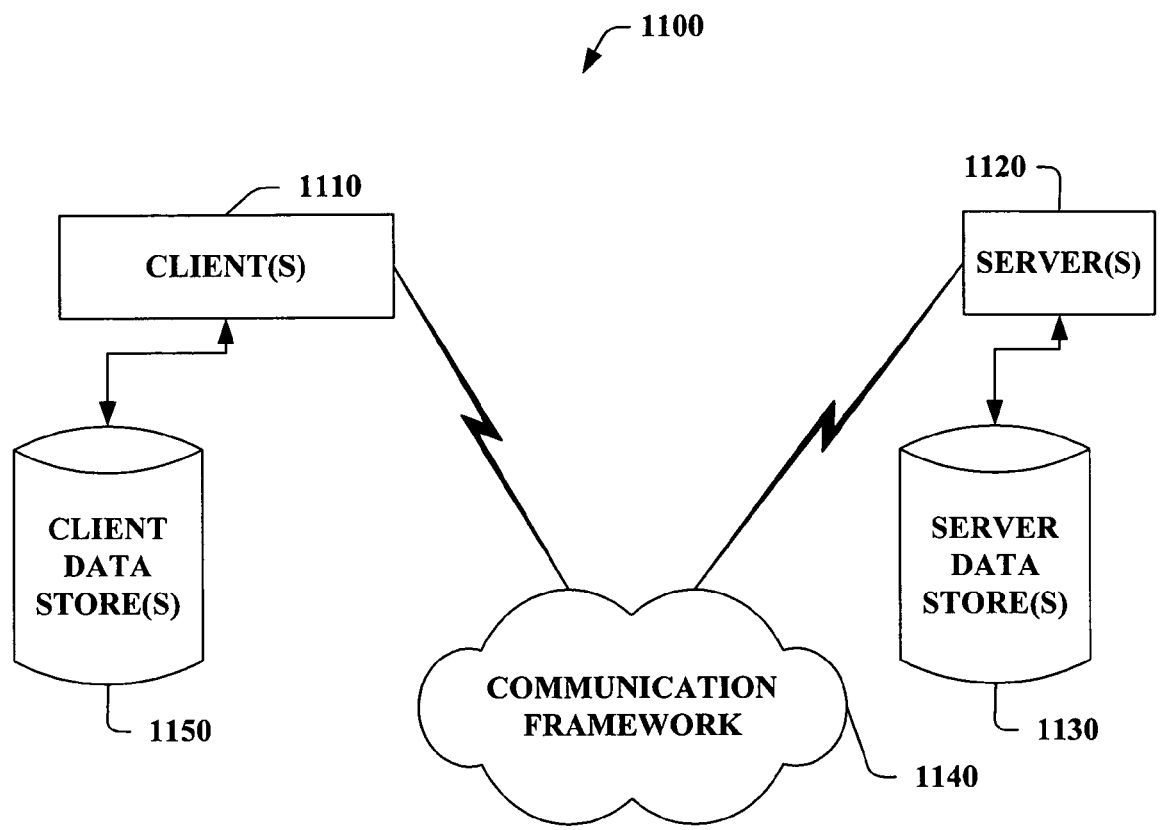
FIG. 11 illustrates an exemplary networking environment, wherein the novel aspects of the claimed subject matter can be employed.
Figure 12:
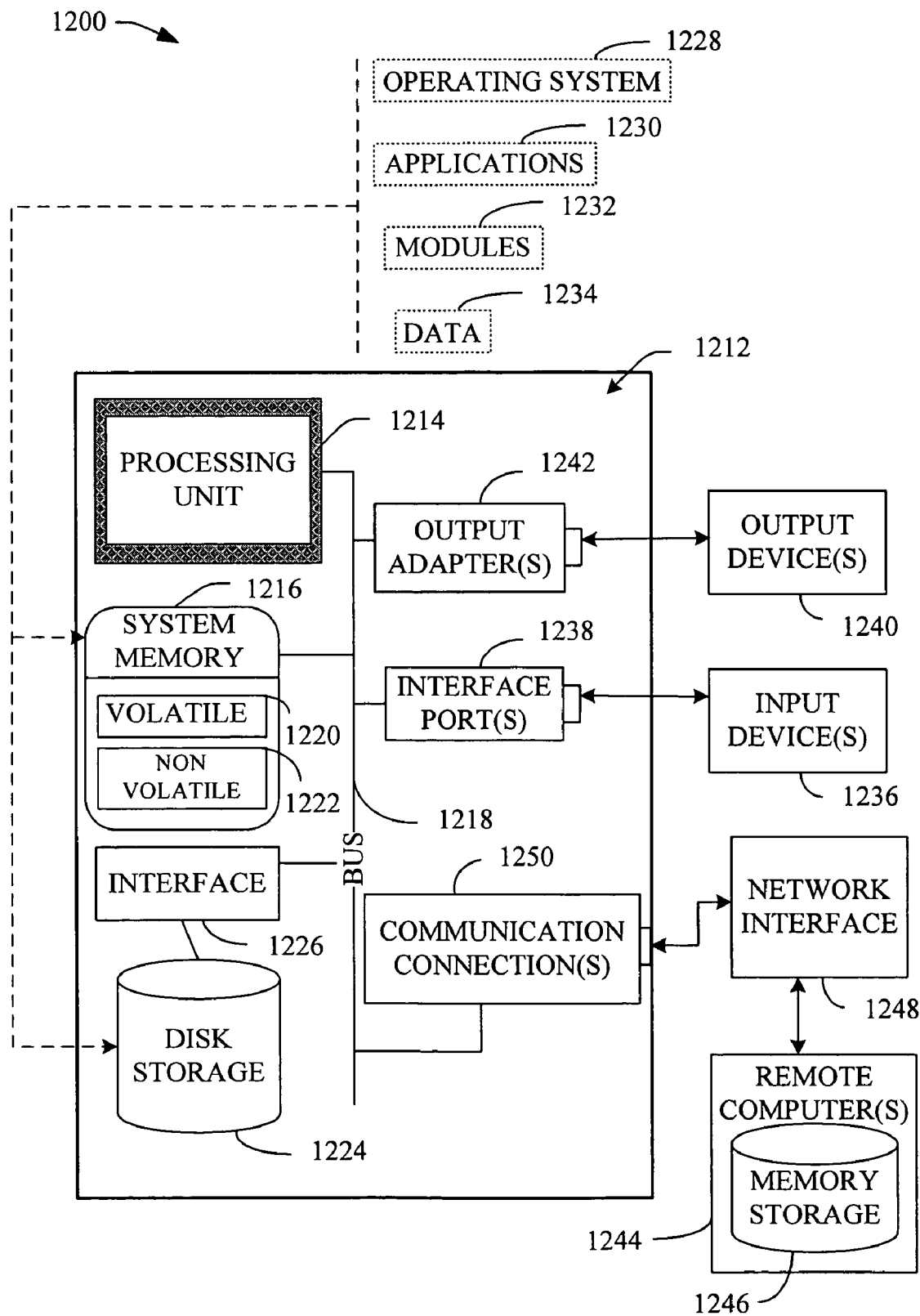
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject innovation can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system comprising a memory having stored therein the following computer executable components:
    a type definition component configured to provide a schema grammar, the schema grammar providing a formal syntax to facilitate an abstract description of types associated with units of information stored in a file storage system;
    an interface component configured to facilitate an interaction with a user in relation to the schema grammar, the interface component configured to provide the user with the schema grammar as a basis for creating a schema, wherein the interface component is configured to receive a user input, the user input based on the schema grammar provided to the user;
    a generator component configured to employ the abstract description of types to create the schema as a function of the user input, the schema relating the units of information stored in the file storage system;
    an association component configured to implement the schema grammar to support a declaration of at least one association between at least two types of data stored as units of information, the declaration ascertained from the user input;
    a type component configured to provide an Entity Type element that declares an entity type in the file storage system, wherein the entity type is a descendant from at least one of an Item, a Link, or an ItemFragment;
    wherein the Item is a smallest unit of consistency in the file storage system, wherein the Link defines an association between two item instances based on an item key, and wherein the ItemFragment enables declaration of a collection of item types and item extensions; and
    wherein the type component is configured to provide a Property Constraint that defines a constraint on a property, wherein the property is a member field defined by a name and a declared type; and
    a processor configured to execute the computer executable components.

2. The system of claim 1, wherein the schema grammar includes at least one of the following to refer to a schema element: a canonical naming convention; a sequence of UNICODE characters; or a common language runtime (CLR) identifier rule.

3. The system of claim 1, further comprising an element component configured to include a root element that employs at least one of: a namespace of the schema; a version of the schema; a versioning class of the schema; a token of a public key of the schema;
    an alias for the namespace in a reference in the schema; or an attribute from an XML schema.

4. The system of claim 3, wherein the element component is configured to utilize a child element that describes a dependency of the schema with at least one of: the namespace of the schema; the version of the schema; an attribute from the schema; an alias utilized in a schema reference in the schema grammar; or a different child element.

5. The system of claim 3, wherein the element component is configured to invoke a documentation element that provides documentation for a schema file utilizing at least one of: a simple element form that includes a textual description; or a structured element form utilized to describe a type and a property associated with the type.

6. The system of claim 1, wherein the type component is configured to provide at least one of: an Inline Type element that declares an inline type that is unique within a set of all types of a schema namespace; or an Enumeration type that declares a set of predefined values that can be set on an instance of a type.

7. The system of claim 6, wherein the type component is configured to provide at least one of: an Enumeration Member element that declares a member of the Enumeration type; a ChangeUnit element that declares a change unit name with an associated identification; or an EntityExtension element that declares an item extension that enables a third-party schema to add structure to an existing item type.

8. The system of claim 6, wherein the type component is configured to assign a default value when a type instance is created to support at least one of a scalar property or an Enumeration type property.

9. The system of claim 1, further comprising an index component configured to provide a Content Index element that can declare a content index on a file storage system property.

10. A computer readable medium having stored thereon the components of the system of claim 1.

11. The system of claim 1, wherein the units of information comprise at least one of a document or an image, and wherein the file storage system data model is configured to describe a type of information stored as the document or image.

12. The system of claim 11, wherein the units of information further comprise at least one of a contact, message, music, or video, and wherein the file storage system data model is configured to describe a type of information stored as the contact, message, music, or video.

13. A computer-implemented method that facilitates developing schemas for a file storage system, comprising:
  employing a processor to execute computer executable instructions stored on a computer readable storage medium to implement the following acts:
    providing a schema grammar to a user as a basis for creating a schema, the schema grammar providing the user with a formal syntax to facilitate an abstract description of types associated with units of information stored in the file storage system;
    receiving a user input, the user input based on the schema grammar provided to the user;
    employing the schema grammar to create the schema as a function of the user input, wherein the schema grammar employs the abstract description of types to describe the units of information as at least one of a type of document, a type of image, a type of music, a type of video, a type of contact, or a type of message, and wherein the schema grammar is employed to support a declaration of at least one association between at least two types of data stored as units of information, the declaration ascertained from the user input;
    declaring an entity type in the file storage system, wherein the entity type is a descendant from at least one of an Item, a Link, or an ItemFragment;
      wherein the Item is a smallest unit of consistency in the file storage system, wherein the Link defines an association between two item instances based on an item key, and wherein the ItemFragment enables declaration of a collection of item types and item extensions; and
      providing a Property Constraint that defines a constraint on a property, wherein the property is a member field defined by a name and a declared type.

14. The method of claim 13, the employing act further comprising creating the schema to include at least a portion of the user input, the portion of the user input including instructions for facilitating at least one of the following:
  providing a versioning specification for the schema that specifies a version of the schema; or
  declaring a content indexing specification for the schema, wherein the content indexing specification enables indexing of a property of the file storage system, and wherein the property of the file storage system comprises an Item that is a smallest unit of consistency of a unit of information stored in the file storage system 15. The method of claim 13, further comprising deploying the schema in the file storage system.

16. A computer executable system comprising a memory having stored therein computer executable components configured to transmit a data packet that facilitates a communication between a type definition component and an interface, wherein the communication facilitates performing the method of claim 13, and wherein a processor executes the computer executable components.

* * * * *